United States Patent
Fogal, Sr.

(10) Patent No.: US 6,412,524 B1
(45) Date of Patent: Jul. 2, 2002

(54) APPARATUS FOR INTRODUCING FLOWABLE FORCE COMPENSATING MATERIAL INTO A TIRE

(75) Inventor: Robert D. Fogal, Sr., Chambersburg, PA (US)

(73) Assignee: International Marketing, Inc., Chambersburg, PA (US)

( * ) Notice: Subject to any disclaimer, the term of this patent is extended or adjusted under 35 U.S.C. 154(b) by 0 days.

(21) Appl. No.: 09/715,861

(22) Filed: Nov. 17, 2000

(51) Int. Cl.$^7$ ................................................ B65B 1/04
(52) U.S. Cl. .......................... 141/38; 141/67; 141/100; 141/286; 406/146; 156/75
(58) Field of Search ........................... 141/9, 5, 38, 67, 141/100, 285, 286; 406/38, 146; 156/75, 154.1

(56) References Cited

U.S. PATENT DOCUMENTS

| | | |
|---|---|---|
| 1,467,488 A | 9/1923 | Muste |
| 2,792,262 A | 5/1957 | Hathorn |
| 2,817,310 A | 12/1957 | Ponzini |
| 3,065,774 A | 11/1962 | Grimes |
| 3,200,858 A | 8/1965 | Kampert |
| 3,450,170 A | 6/1969 | Andersen |
| 3,515,181 A | 6/1970 | Sperberg |
| 4,027,712 A | 6/1977 | Verdier |
| 4,665,956 A | 5/1987 | Freeman |
| 4,678,377 A | 7/1987 | Bouchard |
| 4,917,544 A | 4/1990 | Crahan et al. |
| 5,073,217 A | 12/1991 | Fogal |
| 5,386,857 A | 2/1995 | Fogal, Sr. et al. |
| 5,472,023 A | 12/1995 | Fogal, Sr. et al. |
| 5,931,204 A | 8/1999 | Fogal, Sr. et al. |

FOREIGN PATENT DOCUMENTS

| | | |
|---|---|---|
| CA | 874283 | 6/1971 |
| CA | 2189290 | 4/1998 |
| DE | 808809 | 7/1951 |

*Primary Examiner*—Steven O. Douglas
(74) *Attorney, Agent, or Firm*—Hahn Loeser & Parks, LLP (57) ABSTRACT

An improved injector apparatus for introducing flowable force compensating material into a tire/wheel assembly for the purpose of equalizing radial and lateral force variations of the tire/wheel assembly when in use on a vehicle. The injector apparatus generally comprises a container having a cylindrical side wall, an inlet end cap and an outlet end cap, which together enclose a chamber for flowable force compensating material, and a flexible hose having a quick disconnect coupling at its discharge end for conveying a mixture of pressurized air and flowable force compensating material from the chamber to the interior of a tire/wheel assembly. The outlet end cap comprises at least one channel groove, which helps direct the flowable force compensating material toward an outlet fitting in a manner preventing the flowable force compensating material from getting trapped in the cylinder.

18 Claims, 12 Drawing Sheets

APPARATUS FOR INTRODUCING FLOWABLE FORCE COMPENSATING MATERIAL INTO A TIRE

BACKGROUND OF THE INVENTION

The invention is directed to a novel improvement to an injector apparatus for introducing flowable force compensating material into pneumatic tires, specifically radial tires of tire/wheel assemblies of passenger vehicles, truck vehicles, and aircraft. The term flowable force compensating materials as used herein generally refers to any composition, that may be introduced into the pressure chamber of a tire/wheel assembly through an associated tire valve to affect dynamic balancing of the associated wheel assembly and equalization of radial and lateral load force variations as the wheel assembly is subjected to impact forces during rotation thereof along a surface, such as a road, airfield, or the like. An example of one of these types of flowable force compensating materials is shown in U.S. Pat. No. 5,073,217 in the name of Robert D. Fogal, Sr. issued on Dec. 17, 1991, and is herein incorporated by reference.

The injector apparatus is specifically directed to utilizing a flowable force compensating material or composition and introducing the same into a tire. The amount of material used in a particular tire/wheel assembly generally depends on the size of the tire. In general, smaller tires use less material. Current versions of these types of injectors are susceptible to retaining a portion of the material in the apparatus in corners, crevaces, on walls, etc. One such version is disclosed in U.S. Pat. No. 5,472,023 in the name of Robert D. Fogal, Sr. issued on Dec. 5, 1995, and is herein incorporated by reference. Another version is disclosed in Canadian Laid Open Application No. 2,189,290 in the name of Ian Savidge and is herein incorporated by reference. In larger tires, the lost amount of material is of little consequence due to the larger amount of material necessary for insertion into the tire/wheel assembly. However, in smaller tires, such as passenger tires, the lost amount makes up a significant portion of the amount intended to be inserted into the tire/wheel assembly. The loss of an amount of material may result in an insufficient amount of material inserted into the wheel assembly such that the material will not adequately equalize radial and lateral force variations during tire rotation.

Therefore, there remains a need in the art for an improvement to the existing injectors of the type for introducing flowable force compensating material into tires in order to overcome the deficiencies discussed above.

SUMMARY OF THE INVENTION

It is an object of the present invention to provide an improved injector for the introduction of flowable force compensating material into the interior chamber of a tire/wheel assembly. In keeping with the present invention, the injector for introducing the flowable force compensating material into a tire through an associated tire valve stem under the influence of the pressurized air includes a generally cylindrical container. The cylindrical container defines a chamber having an inlet end and an outlet end. Pressurized air forces a flowable force compensating material contained within the chamber through an outlet in the outlet end of the chamber. The flowable force compensating material is then forced by the pressurized air through an attached hose and is introduced into the tire through the tire valve stem. The volume of flowable force compensating material, which is confined, depends on the size of the tire and is sufficient to affect dynamic force compensation of the tire and an associated wheel assembly, but insufficient to fill a tire. The volume of the chamber is sufficient to contain the required volume of flowable force compensating material. The outlet end of the chamber is formed with at least one channel groove, which helps direct and/or propel the material particles into the outlet and prevents flowable force compensating material from being trapped in the chamber, thereby ensuring the proper amount of flowable force compensating material is inserted into the tire/wheel assembly. The at least one channel groove is positioned and oriented in a manner which optimizes the flow of the flowable force compensating material toward the outlet of the chamber. The position and orientation of the at least one channel groove is dependent upon the physical characteristics and operation of the injector apparatus. In an injector apparatus that uses cyclonic air currents, the channel grooves are arcuate in a swirled pattern toward the outlet in a manner and direction complimentary to the swirling pressurized air. In an injector, which uses pressurized air to suck the flowable force compensating material from the bottom of the container, one or more straight channel grooves directed inward toward the outlet in a downward slope will allow gravity to aid the pressurized air in directing and forcing the flowable force compensating material toward the outlet. There are innumerable flowable force compensating material injector configurations that can be developed. It is contemplated that this invention will improve their overall performance, regardless of the configuration, by the addition of the at least one channel groove to help direct the flowable force compensating material toward the outlet and prevent the material from being trapped in the chamber.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

A novel improvement to an injector apparatus for introducing a flowable force compensating material into the interior of a tire/wheel assembly according to the present invention is illustrated in FIGS. 4 through 12 of the drawings.

Figure 1:
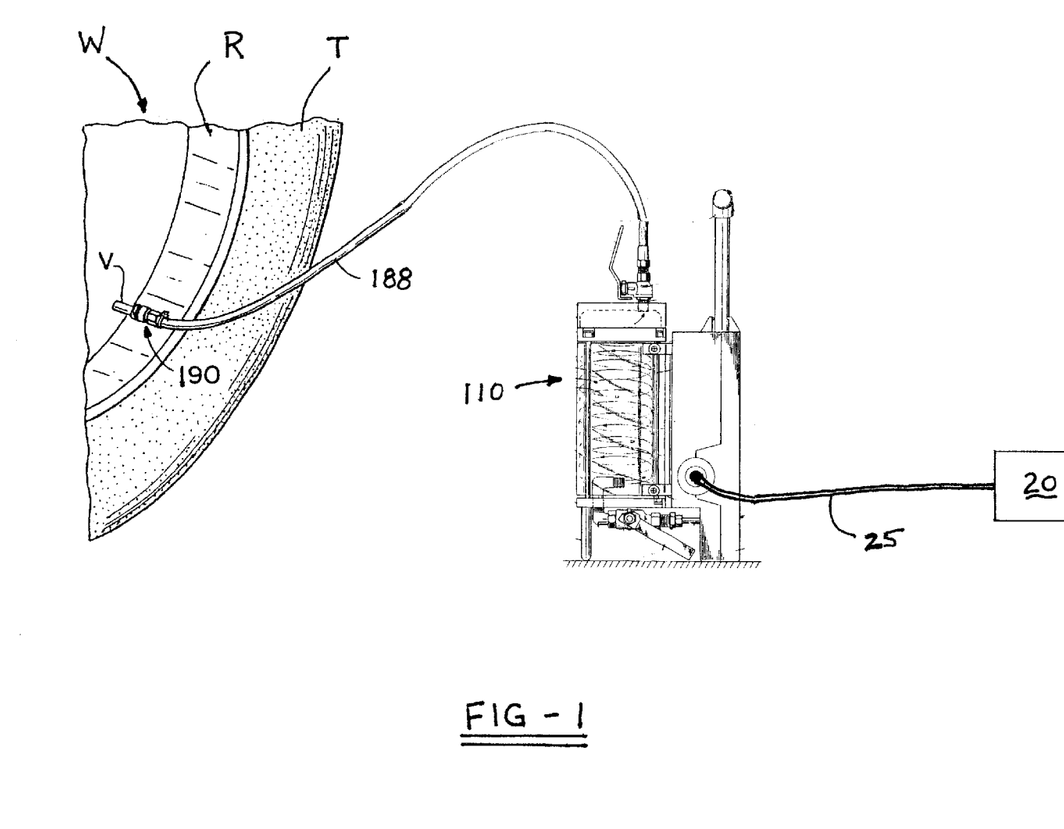
FIG. 1 is a fragmentary perspective view of an apparatus for introducing flowable force compensating material into a tire according to a first embodiment of this invention, and illustrates a source of air pressure, an injector apparatus for introducing flowable force compensating material into a tire/wheel assembly, a flexible hose, and a quick disconnect coupling secured to a valve stem of an associated tire/wheel assembly.

A typical injector apparatus 110 is shown in FIG. 1 associated with a tire/wheel assembly W of an automobile, bus, truck, aircraft, or the like, which includes a tire T (preferably a radial tire), a rim R, and a valve V conventionally secured to the rim R and being in conventional fluid communication with the tire T. The valve V includes a conventional valve core (not shown), which is preferably, though not necessarily, removed during the introduction of the flowable force compensating material into the tire T, as will be described more fully hereinafter. As is conventional, the valve V and associated valve stem constitute the only air inlet/outlet for the tire T. The apparatus 110 is adapted to be connected to a source of pressurized air 20, such as a conventional air compressor through a conventional flexible line or hose 25. The apparatus 110 is connected to the valve V by a quick disconnect coupling 190 at the end of a flexible hose 188 which will be described in detail below. Although the known injector apparatus 110 is shown, the present invention is applicable to any injector apparatus of the type used to inject flowable force compensating materials into a tire/wheel assembly W for the purpose of compensating radial and lateral force variations.

Figure 2:
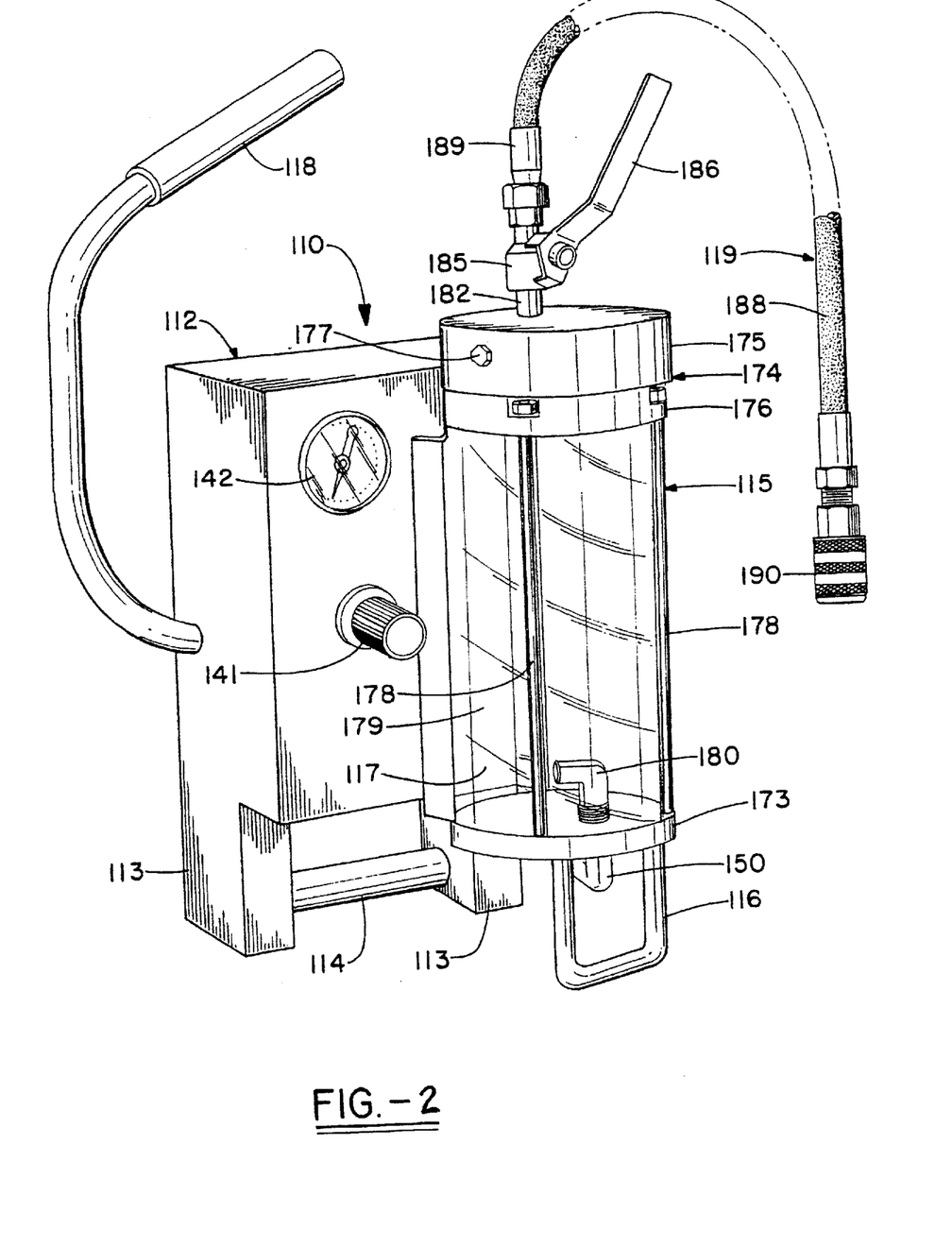
FIG. 2 is a perspective view, as seen from the front, of an injector apparatus for introducing flowable force compensating material into a tire as shown in FIG. 1.

Referring now to FIG. 2, the typical apparatus 110 for introducing flowable force compensating material into a tire as depicted in FIG. 1, is shown. While different injectors utilize different operating principles, all injectors use pressurized air to move and deliver flowable force compensating material from a storage chamber to the interior of a tire/wheel assembly W. The apparatus 110 generally corresponds to the previously discussed injector apparatus disclosed in U.S. Pat. No. 5,472,023. The composition and operation of the injector apparatus 110 is discussed in detail below to provide a background as to how the novel improvement of the present invention can improve the injector apparatus. The improvement is not limited to this type of injector.

Figure 3:
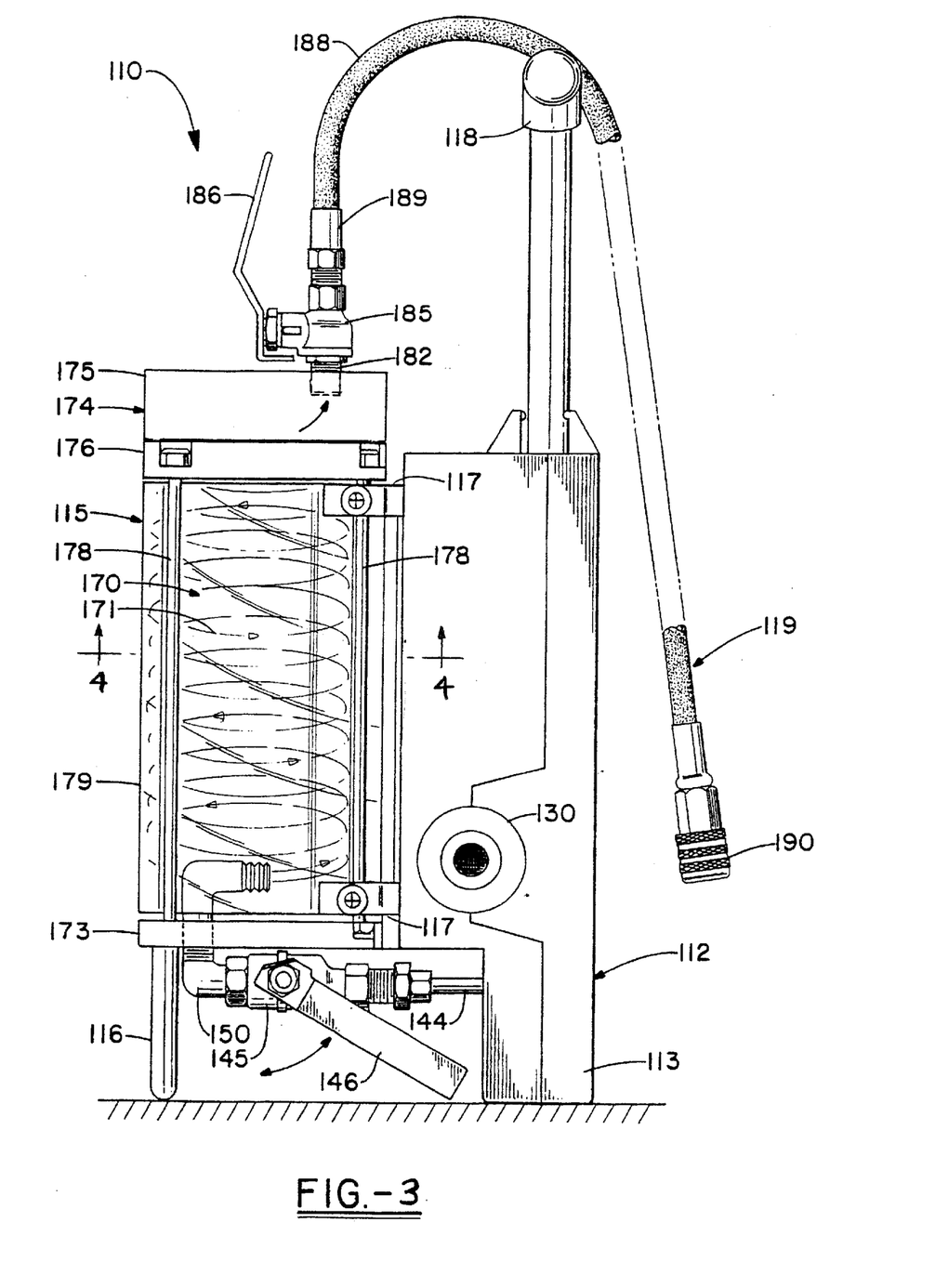
FIG. 3 is a rear elevational view of the injector apparatus shown in FIG. 2.

Apparatus 110 comprises an upright air supply chassis or housing 112 in the shape of a rectangular prism and having legs 113 and a stationary handle 114 at a lower end. Apparatus 110 further comprises an upright cylindrical container or tank assembly 115 for confining a predetermined volume of flowable-force compensating material and forming an air/flowable force compensating material mixture. Cylindrical container assembly 115 has a U-shaped leg 116 depending from a lower end thereof. Chassis 112 and container assembly 115 are fixedly secured together by a pair of spaced mounting brackets 117 (FIG. 3) to form a unitary assembly. Legs 113 and 116 are provided for supporting the apparatus 110 in an upright position. A rotatable handle 118 attached to air supply housing 112, enables a user to carry the apparatus 110 from place to place and to tilt the apparatus 110 from its normal upright position. A flexible hose assembly 119 delivers a pressurized mixture of air and flowable force compensating material from cylindrical container assembly 115 to a tire.

Air supply housing 112 contains the parts or components necessary to provide a flow path for compressed air from a compressed air source 20 to container 115. The compressed air source 20 may be conventional; e.g., an air compressor. For safety reasons, the maximum air supply pressure from this source should not exceed 165 psi. Mounted in one side wall of housing 112 is an in-line filter 130 (FIG. 3), which includes an air intake for connection to the conventional pressurized air source 20. Inside the housing are a pressure regulator (not shown) and means providing a flow path or passageway connecting the in-line filter means 130 and the pressure regulator in series so that all compressed air must flow through filter means 130. Associated with the pressure regulator is a rotatable knob 141 for manually setting outlet air pressure and a pressure gauge 142 for indicating outlet pressure. Both are visible and accessible from a first or front surface of housing 112.

The preferable maximum air pressure-exiting regulator is 125 psi. The minimum outlet pressure should be sufficient to inflate a tire; e.g., at least about 25 psi, but preferably at least about 40 psi.

Tubing 144 (shown in FIG. 3) extends from the outlet of pressure regulator (which is inside housing 112) to an inlet port of a first on/off valve 145. This valve 145 may be opened and closed by means of a manually operable handle 146. Valve 145 is open when handle 146 is horizontal (i.e., in-line with the direction of airflow through the valve) and closed when the handle is vertical (i.e., transverse to the direction of airflow through the valve). Valve 145 controls the supply of compressed air to container assembly 115. A hollow elbow 150 (FIGS. 2 and 3) is connected (e.g., threadedly connected) to an outlet port of valve 145. Elbow 150 provides the inlet passageway to cylindrical container assembly 115.

A container assembly 115 comprises an upright cylindrical container 170 and a transparent safety shield 179. Container 170, in turn, comprises a transparent vertical cylindrical wall 172, an inlet end cap 173 at the lower or inlet ends, and a twist cap assembly 174 at the upper or outlet end. Container 170 has a cylindrical wall or housing 172 (FIG. 4), which is preferably formed of transparent polycarbonate (Lexan). This wall or housing 172 defines a cylindrical chamber 171 of fixed dimensions for containing flowable force compensating material. Container 170, chamber 171, and cylindrical wall 172 have a common vertical axis. Chamber 171 has an inlet end (the lower end) and an outlet end (the upper end).

Container 170 further comprises an inlet end cap 173 at the lower or inlet end and a twist lock outlet end cap assembly 174 at the upper or outlet end. Inlet end cap 173 and outlet end cap assembly 174 enclose the ends of chamber 171. The inlet end cap 173 and outlet end cap assembly 174 are preferably made of a metallic material. The outlet end cap assembly 174 comprises a rotatable and removable outlet end cap 175, a ring or bulkhead 176, which is fixedly secured to one end of cylinder 172, and a button 177, which controls a locking pin (not shown). The outlet end cap 175 normally engages ring 176, but can be twisted and removed by first depressing button 177. This releases the associated locking pin. The chamber 171 can be refilled with flowable force compensating material when the outlet end cap 175 is removed.

Inlet end cap 173 and ring 176 have annular grooves (unnumbered) for receiving terminal edges (unnumbered) of cylindrical wall 172. These edges are preferably glued, ultrasonically bonded, or otherwise permanently secured to the end cap 173 and ring 176 to thereby form a unitary assembly comprising cylindrical wall 172, end cap 173, and ring 176. In addition, a plurality of long screws or tie bolts 178 extend from end cap 173 to ring 176 as an aid in securing these members firmly together.

A vertically extending and generally U-shaped transparent safety shield 179 surrounds cylindrical wall 172, except for the portion of wall 172, which is adjacent to chassis or housing 112. This shield is preferably made of polycarbonate. Shield 179 has a generally cylindrical main portion, which has indentations to avoid interference with screws 178, and a pair of essentially planar end portions, which are affixed (e.g., by bolts) to mounting brackets 117.

Inlet end cap 173 has an opening, preferably off-center, for receiving elbow 150. A second hollow elbow 180, which is inside chamber 171, is connected (e.g. screw-threadedly connected) to the first elbow 150. The second elbow 180 has an L-shaped passageway therethrough. This passageway has a first or vertically extending leg, which is axially aligned with an outlet passageway leg in elbow 150, and a second transversely (or horizontally) extending leg from which compressed air is discharged into chamber 171. The axis of this second leg (which is horizontal) intersects cylindrical wall 172 at an oblique angle. A vertically extending tubular male fitting 182, which may be threaded into a threaded bore (unnumbered) of outlet end cap 175, provides outlet or discharge means for discharge of a mixture of air and flowable force compensating material from chamber 171. This fitting 182 is preferably off center (i.e., not aligned with the central axis of cylinder 172).

The axes of the discharge leg of elbow 180 and the fitting 182 are not aligned. The former is horizontal; the latter is vertical. This nonaligned configuration produces pressurized cyclonic air currents in chamber 171. This promotes efficient and uniform pickup or entrainment of flowable force compensating material in the air stream flowing through chamber 171. Formation of cyclonic air currents is aided by directing the air stream from elbow 180 toward the cylindrical wall 172 so that the angle of intersection is an oblique angle rather than a right angle, and by placing the axis of the end fitting 182 off center rather than coincident with the central axis of cylinder 172.

An on/off valve 185, which is opened and closed by means of a manually operable handle 186, controls flow of air and flowable force compensating material through flexible hose assembly 119. This valve may be conventional. Valve 185 is threaded at one end to connector or fitting 182 and at an opposite end to flexible hose assembly 119.

Hose assembly 119 comprises a flexible hose 188, which has two opposite ends. One end has a fitting 189 for connection to on/off valve 185. The other end has a quick disconnect coupling 190, which may be conventional for connection to a valve stem V of a wheel assembly W. Valve 185, fitting 189, hose 188, and quick disconnect coupling 190 together provide a flow path for a mixture of pressurized air and flowable force compensating material from a container 115 to a tire T.

Valves 145 and 185 are open when the respective handles 146 and 186 are in-line (i.e., parallel to the direction of air flow through the respective valves) and closed when the respective handles are perpendicular to the direction of air flow. These handles are shown in intermediate position so as not to obscure the structural elements, which form a flow path or passage for airflow.

Container 170 may be made of any convenient size. A specific container 115 may have an inside diameter of 2-11/16 (2.68) inches (6.82 cm) and a length of 7 inches (17.8 cm), giving a volume of 39.7 cubic inches (650 cubic centimeters). This is appreciably smaller than some existing delivery devices, but is large enough to hold flowable force compensating material sufficient for force compensating most tires and their associated wheel assemblies. This illustrative volume will contain about 600 grams, or about 21 ounces of flowable force compensating material, assuming a bulk density of 0.93 gram/cc. The container can be made larger (e.g., up to a volume sufficient to hold 24 ounces (680 grams) of flowable force compensating material), if desired.

The amount of flowable force compensating material charged to container 170 is sufficient to affect dynamic balancing and equalization of radial and lateral force variations of a tire and an associated wheel assembly, but insufficient to fill the tire. Similarly, the volume or capacity of chamber 171 must be large enough to contain a quantity of flowable force compensating material sufficient for balancing a tire and associated wheel assembly, but need not be (and preferably is not) large enough to contain sufficient flowable force compensating material to fill a tire.

The amount of flowable force compensating material P, which is introduced into the chamber 171 of the container 170, depends upon the particular size of the tire that is to be charged, and may, for example, range from 1 ounces (28 grams) to 24 ounces (680 grams). For example, for a tire size 215/85 (R16), 3 ounces of the flowable force compensating material is sufficient per tire. A tire size of 205/60 (R17.3) requires 4 ounces of flowable force compensating material P per tire, whereas a 235/80 (R22.5) tire size requires 6 ounces of the flowable force compensating material P. At the larger spectrum of tire sizes, an 18 (R22.5) tire size requires 24 ounces of the flowable force compensating material P. Thus, the overall size of the chamber 171 of container 170 must be sufficient to adequately contain anywhere from 3 ounces to 24 ounces of the flowable force compensating material P, and it has been found that a chamber 171 of approximately 16 inches (40.6 centimeters) end-to-end of a 3 inch (7.62 cm) internal diameter will accommodate up to and beyond the maximum 24 ounces (680 grams) of flowable force compensating material and create and maintain the desired cyclonic pressurized air currents heretofore noted.

The container 170 is filled as follows: First the apparatus is disconnected from the compressed air supply 20. Then the chamber 171 of container 170 is depressurized by holding the hose 188 away from the user (or operator) and others, and opening valve 185. Then, while the apparatus 110 is vertical, as shown in FIGS. 1 and 2, the user depresses the locking cap button 177, rotates the outlet end cap 175 counterclockwise, and removes the cap. (If the chamber 171 is still pressurized, air will rush out as the locking button 177 is depressed.) The chamber 171 is then filled by pouring polymeric flowable force compensating material P into the open end of the container 115. The outlet end cap 175 is then reinstalled by depressing the locking button 177, setting the outlet end cap 175 in place on bulkhead 176 (an arrow may be provided on the bulkhead 176 to denote alignment of button 177), and rotating clockwise until the pin associated with button 177 locks in place.

Operation of the apparatus 110 is as follows: First both ball valves 145 and 185 are closed. Then the valve core of the tire valve is removed from the valve stem, and tire air pressure is bled down to 30% of recommended tire pressure. The quick disconnect assembly 190 of flexible hose 117 is connected to the tire valve stem. The air intake end of filter 130 of apparatus 110 is then connected to a supply of compressed air. The outlet pressure of the pressure regulator is adjusted (using knob 142) so as not to exceed recommended tire inflation pressure. Next, the ball valve 185 at the hose assembly is opened; then the air supply ball valve 145 is opened. The flowable force compensating material in chamber 171 will begin to swirl. The user, while holding the pivoting handle 118 with the left hand and the fixed handle 114 at the end of chassis 112 with the right hand, slowly lowers the upper end (hose assembly end) of the apparatus until the flowable force compensating material clears the chamber 171. Typically, the control axis of the container 115 will be essentially horizontal or even sloping slightly downward from the inlet end to the outlet end when the last particles of flowable force compensating material are evacuated. The flowable force compensating material has been transferred to a tire at this point. Next, the two ball valves 145 and 185 are closed. Air supply ball valve 145 is closed first, then hose assembly ball valve 180 is closed. The hose assembly is disconnected from the tire valve stem and the valve stem core is replaced. The tire is re-aired or "pumped up" to recommended pressure. A self-sealing tire valve cap may be installed if desired. Finally, the chamber 171 of cylindrical container 115 is depressurized by holding the hose assembly quick disconnect coupling 190 away from all persons and opening the ball valve 180 at the hose assembly. The container is now ready for refilling and re-use.

In existing prior art delivery systems, it is possible for an amount of the flowable force compensating material to be trapped in the container 115. The flowable force compensating material in these devices can get caught up in corners or just not be sufficiently directed to the outlet end fitting 182. As discussed above, the amount of flowable force compensating material is predetermined for a specific tire. The loss of a small portion of the flowable force compensating material is typically inconsequential when a relatively large amount of flowable force compensating material (such as 24 oz.) is inserted into the wheel assembly, such as is the case with truck tires. Smaller tires, such as those used in automobiles, typically use small amounts (as low as 3 oz.) of flowable force compensating material, and any loss of material may significantly diminish the ability of the flowable force compensating material to equalize radial and lateral force variations in the wheel assembly.

Figure 4:
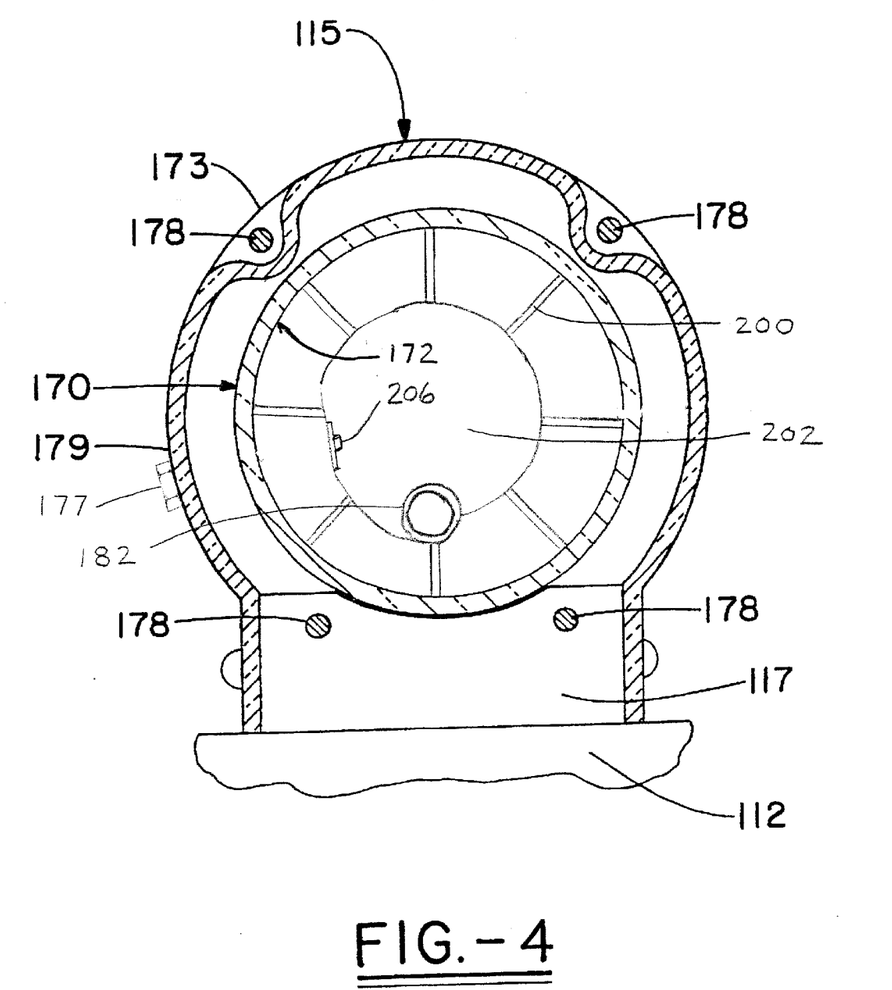
FIG. 4 is a cross-sectional view, taken along line 4—4 of FIG. 3, of a container for flowable force compensating material depicting the at least one channel groove in the outlet end cap according to this invention.
Figure 5:
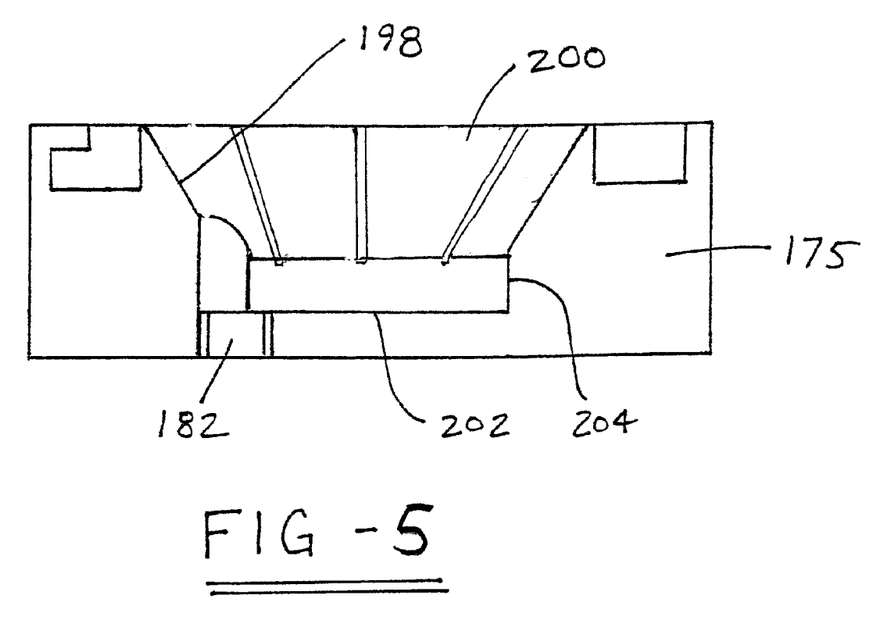
FIG. 5 is a cross-sectional view of the end cap assembly as shown in FIG. 4.

As shown in FIGS. 4 and 5, the outlet end cap 175 has a flat bottom surface 202 bounded by vertical walls 204. The walls 204 are generally circular in shape and help direct the flowable force compensating material toward the outlet fitting 182. Also shown is button 177, which controls a locking pin (not shown), and comprises a pressure release end 206 that extends through wall 204. When the button 177 is depressed to remove the cap 175, the pressure release end 206 of the button 177 allows pressurized air within the chamber to be released.

Figure 6:
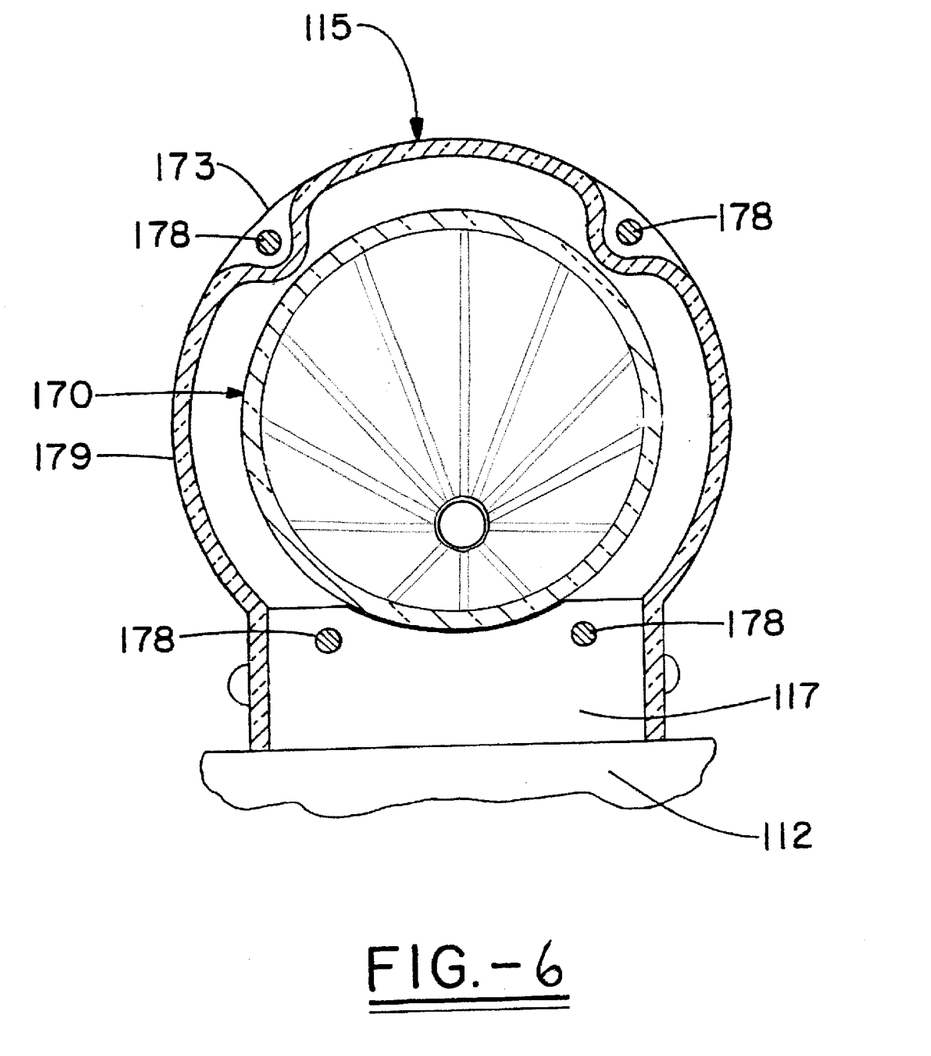
FIG. 6 is a cross-sectional view, taken along line 4—4 of FIG. 3, of a container for flowable force compensating material depicting a first alternate embodiment of the at least one channel groove in the outlet end cap according to this invention.

To overcome the problems mentioned above, the outlet end cap 175 comprises a sloped interior surface 198, which is sloped toward the outlet end fitting 182, as best shown in FIG. 6. The interior surface 198 of the filler cap 175 comprises at least one channeling groove 200 therein to help direct the flowable force compensating material toward the outlet end fitting 182. The channeling grooves 200 may be oriented, sized, and placed in an innumerable manner to help direct and/or propel the flowable force compensating material toward the outlet end fitting 182. It is contemplated that the cross-section of the grooves 200 may be of any shape that will help direct and/or propel the flowable force compensating material through the groove 200 such as, but not limited to, rectangular, semicircular, rounded edges, differing groove wall heights on either side of the groove 200, etc. In addition, it is contemplated that the cross-section of the grooves 200 can be tapered in depth and/or width such that the groove depth and/or width cross-sectional area either increases, decreases, or stays constant as the groove 200 approaches the outlet. In a first embodiment, the channeling grooves are oriented radially downward toward the center of the flat bottom surface 202. The radial orientation of the channeling grooves 200 helps direct and/or propel the flowable force compensating material toward the bottom surface 202. In injectors where the outlet is at the bottom of the chamber, the grooves 200 work with gravity to propel the flowable force compensating material toward the bottom surface 202, which contains the outlet end fitting 182.

Figure 7:
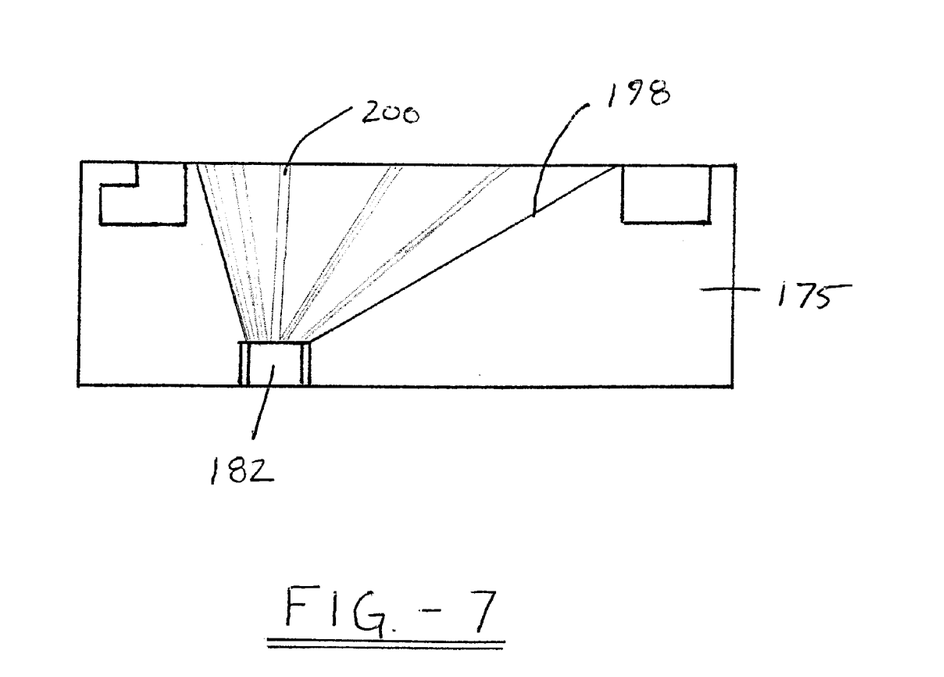
FIG. 7 is a cross-sectional view of the end cap assembly as shown in FIG. 6.

As shown in FIGS. 6 and 7, a second embodiment of the outlet end cap 175 is depicted wherein the flat bottom surface 202 has been eliminated such that the interior surface 198 slopes down directly toward the outlet 182. The channeling grooves 200 are oriented radially downward directly toward the center of the outlet end fitting 182. The radial orientation of the channeling grooves 200 helps direct and/or propel the flowable force compensating material toward the outlet end fitting 182. In injectors where the outlet is at the bottom of the chamber, the grooves work with gravity to propel the flowable force compensating material toward the outlet end fitting 182.

Figure 8:
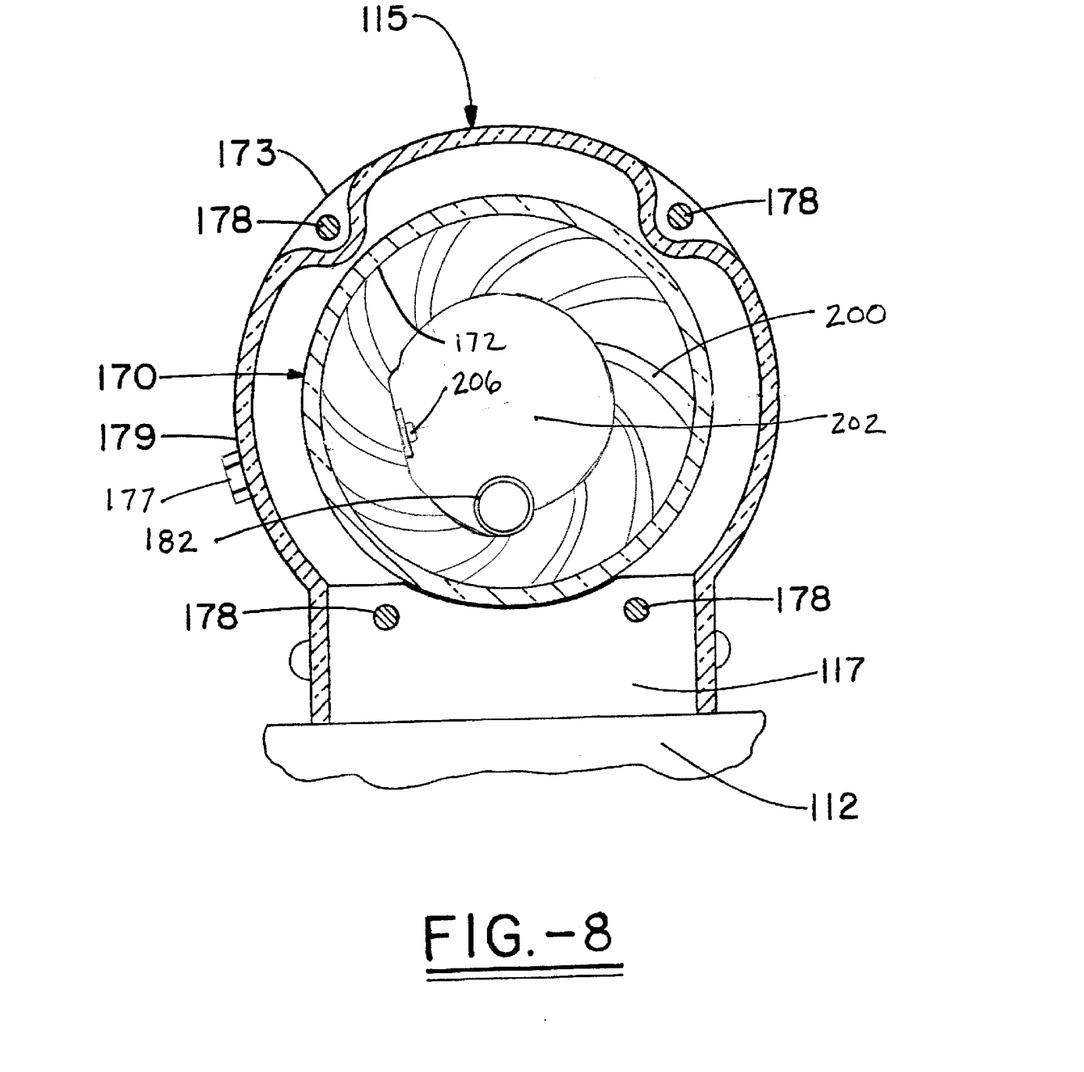
FIG. 8 is a cross-sectional view, taken along line 4—4 of FIG. 3, showing a second alternate embodiment of the at least one channel groove in the outlet end cap according to this invention.
Figure 9:
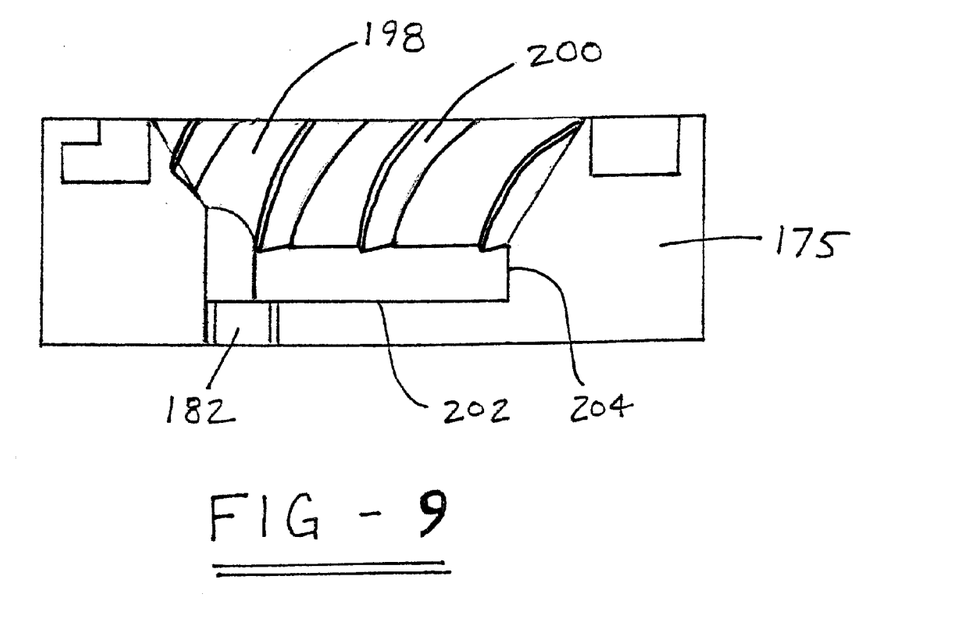
FIG. 9 is a cross-sectional view of the end cap assembly as shown in FIG. 8.
Figure 9A:
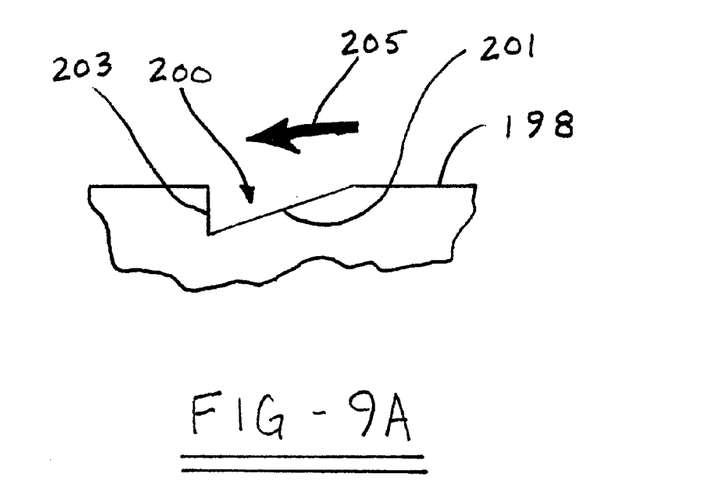
FIG. 9A is a cross-sectional view of a channel groove in the end cap assembly of FIG. 8.

As shown in FIGS. 8, 9, and 9A, another embodiment of the outlet end cap 175 is depicted wherein the channeling grooves 200 are oriented in an arc or spiral downward toward the flat bottom surface 202. The spiral orientation of the channeling grooves 200 helps direct and/or propel the flowable force compensating material toward the flat bottom surface 202. In injectors using cyclonic action to direct the flowable force compensating material toward the outlet, the spiral is oriented in a manner corresponding to the direction of rotation of the cyclonic action such that the flowable force compensating material will be propelled toward the flat bottom surface 202 containing the outlet end fitting 182. The cross-section of a spiral channeling groove 200 on sloped interior surface 198 is shown in FIG. 9A. The spiral channeling groove 200 has an angled surface 201 sloping downward with respect to interior surface 198 and mating with spiral channel groove wall 203. Spiral channel groove wall 203 is generally perpendicular to interior surface 198. Also shown is cyclonic air flow direction 205. The configuration of spiral channeling groove 200 enables the cyclonic air flow 205 to force the compensating material particles along the angled surface 201 of spiral channeling groove 200 where the channel groove wall 203 redirects the flow toward flat bottom surface 202. The spiral channeling grooves 200, in combination with the cyclonic air currents, will help direct the flowable force compensating material toward the flat bottom surface 202 and prevent the flowable force compensating material from clogging up the grooves 200.

Figure 10:
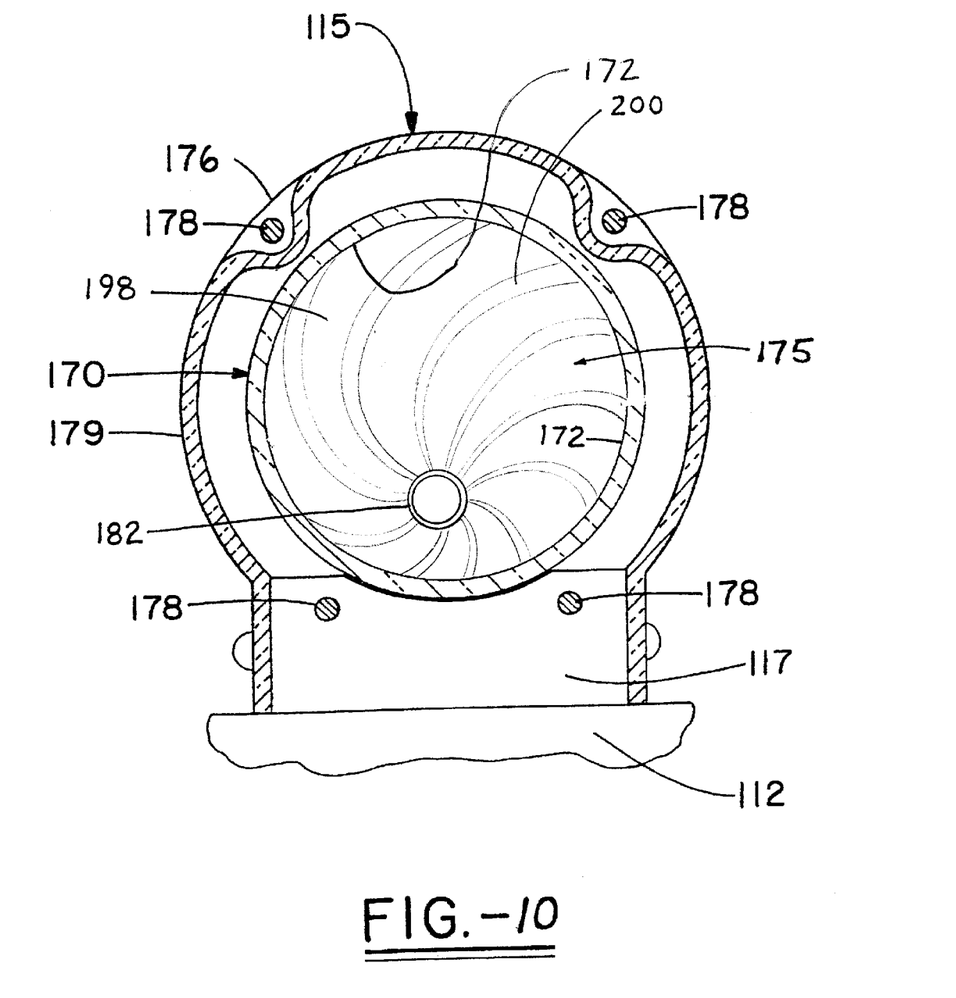
FIG. 10 is a cross-sectional view, taken along line 4—4 of FIG. 3, showing another alternate embodiment of the at least one channel groove in the outlet end cap according to this invention.
Figure 11:
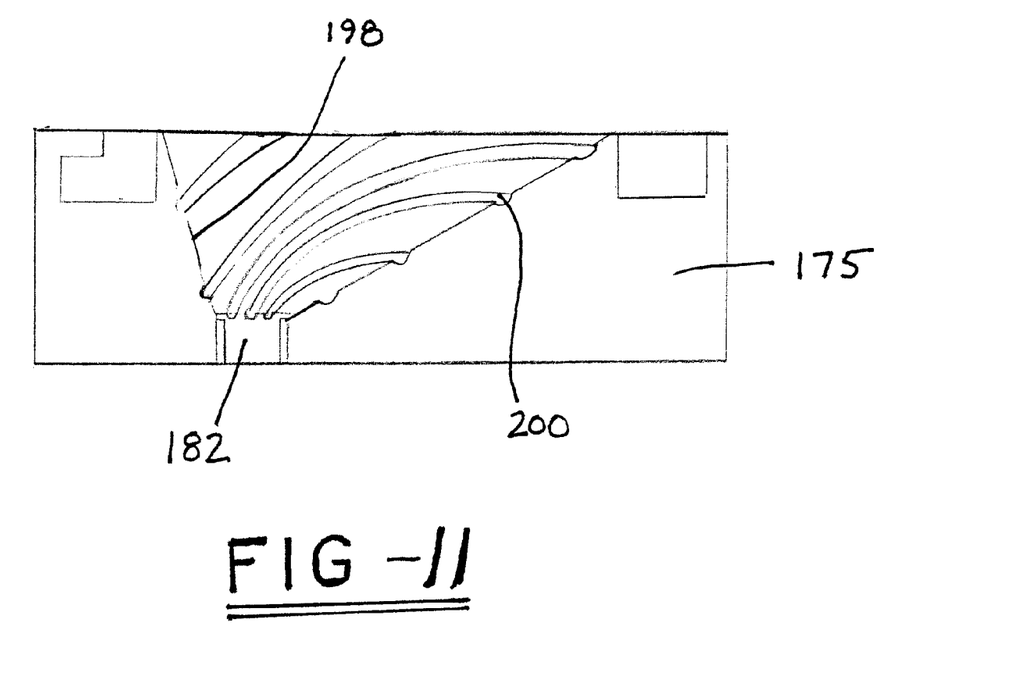
FIG. 11 is a cross-sectional view of the end cap assembly as shown in FIG. 10 showing a concave conical surface.
Figure 12:
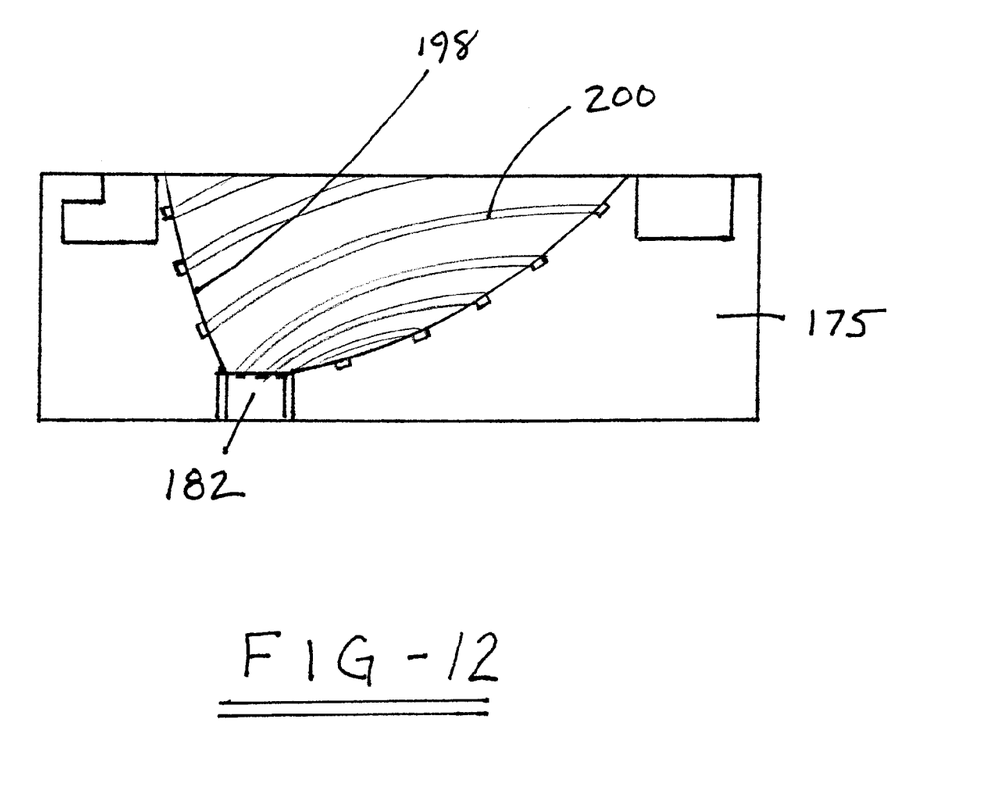
FIG. 12 is a cross-sectional view of the end cap assembly as shown in FIG. 10 showing a concave curved surface.

As shown in FIGS. 10, 11, and 12, two additional embodiment are depicted. The interior surface 198 extends completely down to the outlet end fitting 182 as in the embodiment shown in FIGS. 6 and 7. However, in this embodiment, the grooves 200 are in a spiral configuration. Additionally, it is contemplated that the interior surface 198 of the filler cap 175 is sloped in a straight line as shown in FIG. 11 or in a rounded concave manner as shown in FIG. 12. In injectors using cyclonic action to direct the flowable force compensating material toward the outlet, the spiral is oriented in a manner corresponding to the direction of rotation of the cyclonic action, such that the flowable force compensating material will be propelled toward the outlet end fitting 182.

The spiral channeling grooves 200, in combination with the cyclonic air currents, will help direct the flowable force compensating material toward the outlet end fitting 182 and prevent the flowable force compensating material from clogging up the grooves 200.

In injectors having a pressure release in the outlet end cap 175, the continuous slope embodiments depicted in FIGS. 6, 7, 10–12 can have a pressure release end (not shown) that is flush with the interior surface 198 so as not to provide interference with the cyclonic action that works with the sloped and grooved interior surface 198 to direct all of the flowable force compensating material to the outlet end fitting 182.

Although the figures depict an off-center outlet 182, it is contemplated that the outlet 182 can be located anywhere on the interior surface 198 including the center of the outlet end cap.

It is also contemplated that the interior surface 198 including the grooves 200 are coated with a nonstick substance such as TEFLON®, or the like, to help prevent the flowable force compensating material from adhering to these surfaces.

As previously stated, prior art container 170 has a cylindrical wall or housing 172 (FIG. 4), which is preferably formed of transparent polycarbonate (Lexan). The transparent material allowed visual confirmation of trapped force compensating material which was prevented from delivery into the tire/wheel assembly. However, the polycarbonate material is susceptible to wear from typical force compensating materials such as pulverulent plastic particles, glass beads, atomized metallic particles, and the like. The above mentioned improvements preventing loss of force compensating material due to being trapped in the injector, also make it convenient to substitute more durable materials for housing 172. An anodized metallic material or any material which will prevent wear of the housing 170 by force compensating material flowing through the injector, in a manner such as force compensating material projected by cyclonic air flow forces.

Although preferred embodiments of the invention have been specifically illustrated and described herein, it is to be understood that variations may be made in the apparatus without departing from the spirit and scope of the invention, as defined in the appended claims.

What is claimed is:

1. An apparatus for introducing a flowable force compensating material into a tire through a tire valve stem comprising:
    an essentially rigid and essentially cylindrical container defining a chamber for confining a predetermined amount of flowable force compensating material, said chamber having an air outlet at an end thereof;
    wherein a pressurized air source forces said flowable force compensating material through said air outlet;
    wherein said end comprises at least one channel groove on an interior surface thereof which helps direct said flowable force compensating material toward said air outlet; and
    means for introducing an admixture of pressurized air and said flowable force compensating material into said tire through said tire valve stem.

2. The apparatus defined in claim 1, wherein said at least one channel groove generally extends radially from an edge of said end toward said air outlet.

3. The apparatus defined in claim 1, wherein said at least one channel groove generally extends in an arc from an edge of said end toward said air outlet.

4. The apparatus defined in claim 1, wherein said at least one channel groove has a constant cross-sectional area.

5. The apparatus defined in claim 1, wherein said at least one channel groove has a varying constant cross-sectional area.

6. The apparatus defined in claim 1, wherein said at least one channel groove has a constant depth.

7. The apparatus defined in claim 1, wherein said at least one channel groove has a varying depth.

8. The apparatus defined in claim 1, wherein said at least one channel groove has a constant width.

9. The apparatus defined in claim 1, wherein said at least one channel groove has a varying width.

10. The apparatus defined in claim 1, wherein said at least one channel groove has a varying width.

11. The apparatus defined in claim 1, wherein said pressurized air source which forces said flowable force compensating material through said air outlet comprises cyclonic air flow.

12. The apparatus defined in claim 1, wherein said cylindrical container comprises a material which will prevent wear of the cylindrical container by said flowable force compensating material.

13. An apparatus for introducing a flowable force compensating material into a tire through a tire valve stem comprising:
    an essentially rigid and essentially cylindrical container defining a chamber for confining a predetermined amount of flowable force compensating material, said chamber having an air outlet at an end thereof;
    wherein a pressurized air source forces said flowable force compensating material through said air outlet; and
    means for introducing an admixture of pressurized air and said flowable force compensating material into said tire through said tire valve stem;
    wherein said cylindrical container comprises a material which will prevent wear of the cylindrical container by said flowable force compensating material;
    wherein said end of said cylindrical chamber comprises at least one channel groove on an interior surface thereof which helps direct said flowable force compensating material toward said air outlet.

14. An apparatus for introducing a flowable force compensating material into a tire through a tire valve stem comprising:
    an essentially rigid and essentially cylindrical container defining a chamber for confining a predetermined amount of flowable force compensating material, said chamber having an air outlet at an end thereof;
    wherein a pressurized air source forces said flowable force compensating material through said air outlet using cyclonic air flow forces;
    wherein said end comprises at least one channel groove on an interior surface thereof which helps direct said flowable force compensating material toward said air outlet; and
    means for introducing an admixture of pressurized air and said flowable force compensating material into said tire through said tire valve stem.

15. The apparatus defined in claim 1, wherein said at least one channel groove generally extends in an arc from an edge of said end toward said air outlet.

16. The apparatus defined in claim 1, wherein said at least one channel groove has a constant cross-sectional area.

17. The apparatus defined in claim 1, wherein said at least one channel groove has a varying constant cross-sectional area.

18. The apparatus defined in claim 1, wherein said at least one channel groove has a varying width.

* * * * *